United States Patent
Hiraki et al.

(10) Patent No.: US 9,767,834 B1
(45) Date of Patent: Sep. 19, 2017

(54) MAGNETIC HEAD COMPRISING MAGNETO-RESISTANCE EFFECT ELEMENT AND SIDE SHIELDS

(71) Applicant: TDK Corporation, Tokyo (JP)

(72) Inventors: Tetsuya Hiraki, Tokyo (JP); Minoru Ota, Tokyo (JP); Hisayoshi Watanabe, Tokyo (JP); Takahiko Machita, Tokyo (JP); Hideyuki Ukita, Tokyo (JP)

(73) Assignee: TDK Corporation, Tokyo (JP)

( * ) Notice: Subject to any disclaimer, the term of this patent is extended or adjusted under 35 U.S.C. 154(b) by 11 days.

(21) Appl. No.: 15/074,071

(22) Filed: Mar. 18, 2016

(51) Int. Cl.
*G11B 5/39* (2006.01)

(52) U.S. Cl.
CPC .............. *G11B 5/3912* (2013.01); *G11B 5/39* (2013.01); *G11B 5/3906* (2013.01); *G11B 5/3932* (2013.01)

(58) Field of Classification Search
CPC ....... G11B 5/39; G11B 5/3906; G11B 5/3912; G11B 5/3932
USPC .......................................................... 360/319
See application file for complete search history.

(56) References Cited

U.S. PATENT DOCUMENTS

| | | | |
|---|---|---|---|
| 6,819,530 B2 | 11/2004 | Gill | |
| 7,692,901 B2 | 4/2010 | Kagami | |
| 9,053,720 B1 | 6/2015 | Chye et al. | |
| 9,123,886 B2 | 9/2015 | Zhang et al. | |
| 9,269,383 B1* | 2/2016 | Hattori | G11B 5/3932 |
| 2003/0011939 A1 | 1/2003 | Gill | |
| 2010/0232072 A1* | 9/2010 | Dimitrov | B82Y 25/00 360/319 |
| 2011/0216432 A1 | 9/2011 | Yanagisawa | |
| 2012/0134057 A1* | 5/2012 | Song | B82Y 10/00 360/319 |
| 2014/0334041 A1* | 11/2014 | Hase | G01R 33/00 360/319 |
| 2014/0340793 A1* | 11/2014 | Song | G11B 5/11 360/319 |
| 2016/0055866 A1* | 2/2016 | Le | G11B 5/39 360/75 |
| 2017/0033278 A1* | 2/2017 | Lapicki | H01L 43/08 |
| 2017/0076743 A1* | 3/2017 | Hassan | G11B 5/3163 |

* cited by examiner

*Primary Examiner* — Jefferson Evans
(74) *Attorney, Agent, or Firm* — Posz Law Group, PLC

(57) ABSTRACT

A magnetic head includes a magneto-resistance effect element in the form of a multilayer film, a pair of shields between which the magneto-resistance effect element is interposed in the lamination direction of the layers of the magneto-resistance effect element and each functioning as an electrode, a pair of side shields with one of said side shields on each side of the magneto-resistance effect element in the direction perpendicular to the lamination direction of the magneto-resistance effect element interposed between the pair of shields, the side shields magnetically coupled to either of the pair of shields, and an anisotropy-application layer disposed adjacent to the shield magnetically coupled to the pair of side shields. The pair of shields, the magneto-resistance effect element, and the pair of side shields are exposed on the air bearing surface facing a recording medium. The anisotropy-application layer is not exposed on the air bearing surface and is provided at a position away from the air bearing surface.

6 Claims, 4 Drawing Sheets

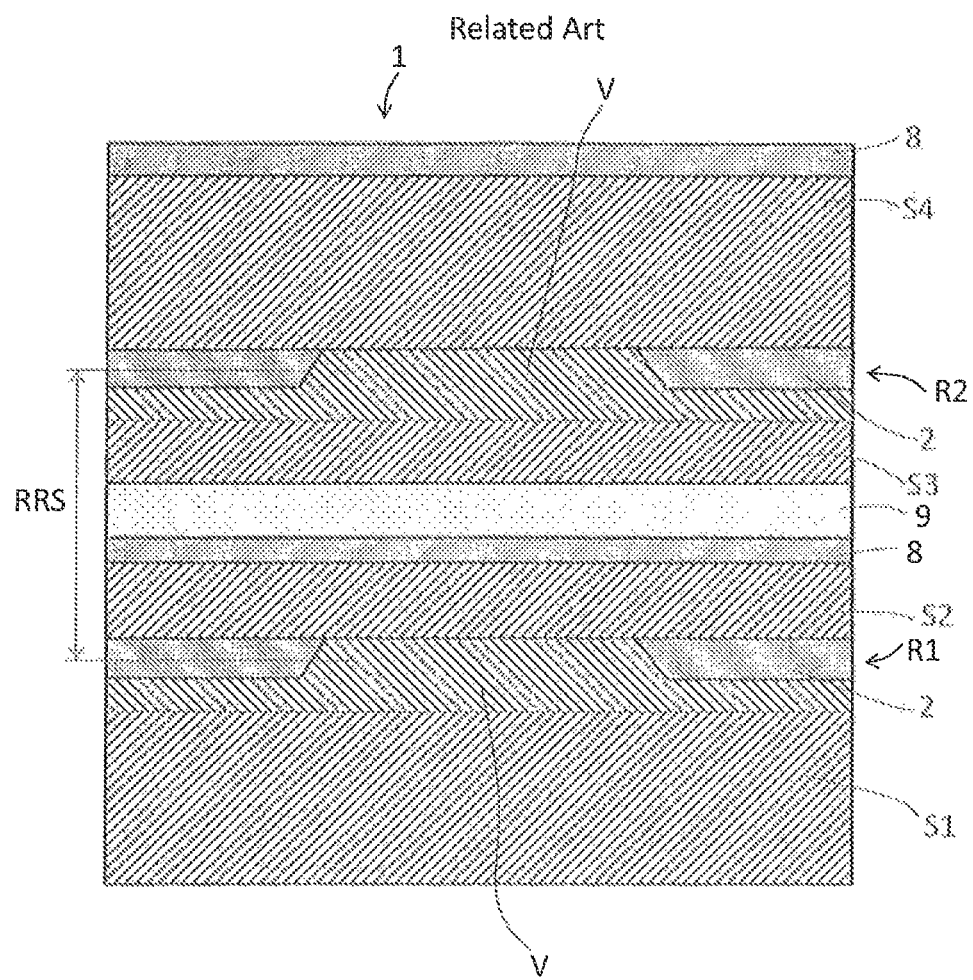

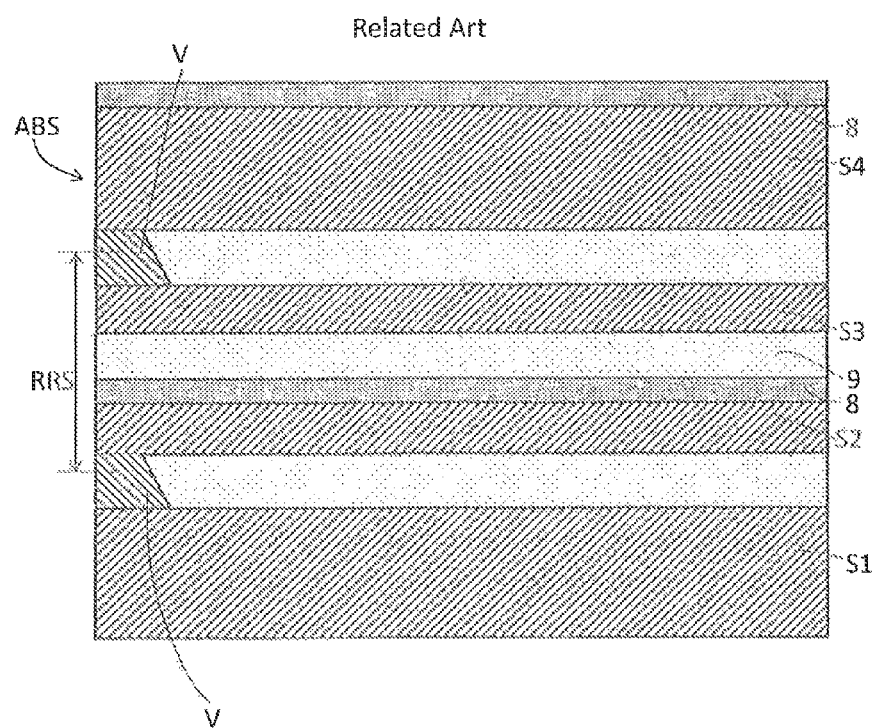

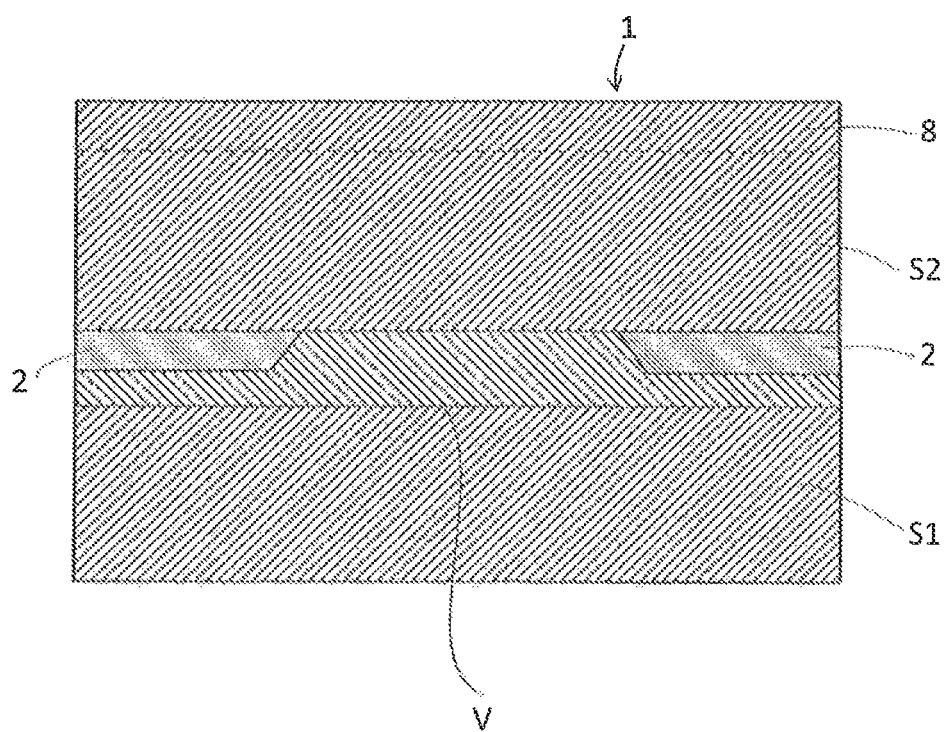

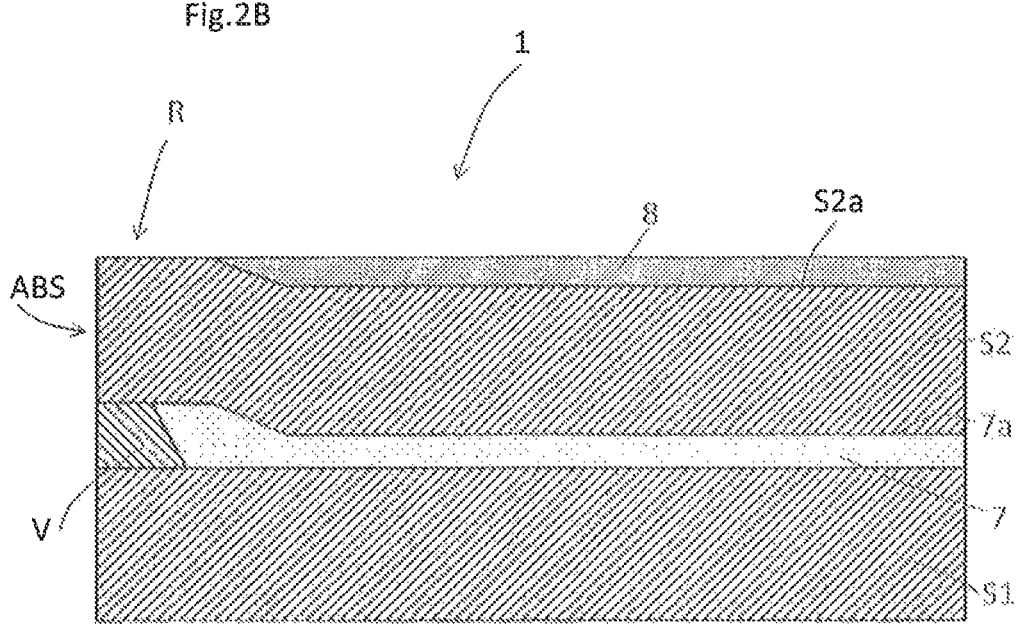

MAGNETIC HEAD COMPRISING MAGNETO-RESISTANCE EFFECT ELEMENT AND SIDE SHIELDS

BACKGROUND OF THE INVENTION

1. Field of the Invention

The present invention relates to a magnetic head including a magneto-resistance effect element and side shields used in hard disc drives (HDD).

2. Description of the Related Art

A magneto-resistance effect element (for example, a TMR (tunnel magneto-resistance effect) element) used in HDD readers is configured of a multilayer film in a spin valve structure consisting of a free layer of which the magnetization direction changes with respect to the external magnetic field, a pinned layer of which the magnetization direction is fixed with respect to the external magnetic field, a spacer layer situated between the free layer and the pinned layer, a pinning layer for fixing the magnetic field of the pinned layer, and the like. The magneto-resistance effect element is interposed between a pair of shields that are situated on both sides in the lamination direction (down track direction) of the layers configuring the magneto-resistance effect element and that also serve as electrodes. The down track direction is the direction along the magnetic recording tracks of a recording medium (HD) read by the magneto-resistance effect element. The direction perpendicular to and crossing the down track direction is the cross track direction.

For example, the magnetic head disclosed in U.S. Pat. No. 7,692,901B1 is provided with side shields on both sides of the magneto-resistance effect element in the direction perpendicular to the lamination direction (the cross track direction). The side shields include a soft magnetic substance and also function as bias magnetic field application layers for aligning the magnetization direction of the free layer, particularly when no external magnetic field is applied. The pair of side shields is magnetically coupled to one of a pair of shields (for example, the upper shield situated above in the lamination direction). Moreover, an anisotropy-application layer (for example, an IrMn layer) is disposed adjacent to the shield magnetically coupled to the side shields. The anisotropy-application layer imparts exchange anisotropy to the adjacent shield to magnetize it in a desired direction (one way in the cross track direction). Then, the pair of side shields magnetically coupled to this shield is magnetized in the same direction as the shield. As described above, the free layer of the magneto-resistance effect element surrounded by the shield and the side shields magnetized in the same direction has a magnetization direction aligned in the cross track direction when no external magnetic field is applied.

A reader having the above side shields and anisotropy-application layer has a configuration in which the magneto-resistance effect element, the pair of shields, and the anisotropy-application layer are stacked, and therefore has a large dimension in the down track direction, whereby the read gap is increased.

Moreover, in order to improve the area density capacitance (ADC) in recent HDDs, multi-reader heads having multiple readers have been developed. US2011/0216432A1 discloses a configuration in which two independent readers comprising a magneto-resistance effect element are each interposed between a pair of shields and are stacked and separated by an insulating layer. When such multiple readers independent from each other are stacked and separated by an insulating layer, and each reader consists of a TMR element or GMR element of the CPP (current perpendicular to plane) type in which the current flows in the direction perpendicular to the main surface of the layers, the positional relationship between the reader situated below and the reader situated above and the accuracy of width and height of the readers are important, and precise processing and control is required. Particularly, it is important to reduce the reader-reader separation (RRS), which affects the accuracy of reading of adjacent tracks, as much as possible, which is a major key point to obtain the features of a multi-reader head. Further, the RRS is the distance in the lamination direction between the centerlines of the free layers of the magneto-resistance effect elements of adjacent readers in the lamination direction.

In a multi-reader head in which multiple readers are stacked as described above, it is required to reduce the RSS to, for example, several tens of nm. As shown in FIGS. 1a and 1b, when a magneto-resistance effect element V and side shields 2 situated on both sides of a reader R1 situated below are interposed between a lower shield S1 and an upper shield S2, and a magneto-resistance effect element V and side shields 2 situated on both sides of a reader R2 situated above are interposed between a lower shield S3 and an upper shield S4, the upper shield S2, the lower shield S3, an inter-element insulating layer 9, and an anisotropy-application layer 8 (IrMn film) are included between the magneto-resistance effect element V of the reader R1 and the magneto-resistance effect element V of the reader V2. If the shields S2 and S3 are excessively thin in order to reduce the RRS, the SN ratio problematically drops because the shields S2 and S3 also serve as the electrodes of the readers R1 and R2. Moreover, there is a limit on reducing the thickness of the inter-element insulating film 9 in order to ensure the withstand voltage of the readers R1 and R2. Thus, there is a need for some other measure to reduce the RRS.

Throughout this specification, regardless of the orientation of the magnetic head in use, the lamination direction of the layers of the magneto-resistance effect element is referred to as the vertical direction, and one side in the lamination direction is referred to as "upper" and the other side is referred to as "lower." As an example, the positional relationship between "upper" and "lower" is defined so that the pinning layer side of a magneto-resistance effect element is referred to as "lower" and the free layer side is referred to as "upper." This lamination direction is equal to the lamination direction of multiple readers of a multi-reader head, and generally the reader formed earlier in the production process of a multi-reader head is "a lower reader" and the reader stacked and formed later is "an upper reader." Moreover, the lamination direction is equal to the down track direction. The terms "upper" and "lower" are used based on the above definition also with regard to various members other than the magneto-resistance effect element and readers.

SUMMARY OF THE INVENTION

The present invention aims to provide a magnetic head including a magneto-resistance effect element and side shields that make it possible to reduce the read gap and reduce the RSS when multiple readers are stacked.

The magnetic head of the present invention includes a magneto-resistance effect element in the form of a multi-layer film, a pair of shields between which the magneto-resistance effect element is interposed in the lamination direction of the layers of the magneto-resistance effect element and each functioning as an electrode, a pair of side shields situated on both sides in the direction perpendicular to the lamination direction of the magneto-resistance effect element interposed between the pair of shields and magnetically coupled to either of the pair of shields, and an anisotropy-application layer disposed adjacent to the shield magnetically coupled to the pair of side shields. The pair of shields, the magneto-resistance effect element, and the pair of side shields are exposed on the air bearing surface facing a recording medium, and the anisotropy-application layer is not exposed on the air bearing surface and is provided at a position away from the air bearing surface.

BRIEF DESCRIPTION OF THE DRAWINGS

FIG. 1A is a front view showing the ABS of a prior art magnetic head;

FIG. 1B is a cross-sectional view perpendicular to the ABS of the magnetic head shown in FIG. 1A;

FIG. 2A is a front view showing the ABS of the magnetic head of the first embodiment of the present invention;

FIG. 2B is a cross-sectional view perpendicular to the ABS of the magnetic head shown in FIG. 2A;

FIG. 3 is an exploded perspective view showing the reader of the magnetic head shown in FIGS. 2A and 2B;

FIG. 4 is a cross-sectional view perpendicular to the ABS, showing an exemplary process of the method of producing the magnetic head shown in FIGS. 2A and 2B;

FIG. 5 is a cross-sectional view perpendicular to the ABS, showing the process following the process shown in FIG. 4;

FIG. 6 is a cross-sectional view perpendicular to the ABS, showing the process following the process shown in FIG. 5;

FIG. 7 is a cross-sectional view perpendicular to the ABS, showing the process following the process shown in FIG. 6;

FIG. 8 is a cross-sectional view perpendicular to the ABS, showing the process following the process shown in FIG. 7;

FIG. 9 is a cross-sectional view perpendicular to the ABS of a modified embodiment of the magnetic head of the first embodiment of the present invention;

FIG. 10 is a cross-sectional view perpendicular to the ABS of the magnetic head of the second embodiment of the present invention;

FIG. 11 is a cross-sectional view perpendicular to the ABS of a modified embodiment of the magnetic head of the second embodiment of the present invention;

FIG. 12 is a cross-sectional view perpendicular to the ABS of the magnetic head of the third embodiment of the present invention;

FIG. 13 is a cross-sectional view perpendicular to the ABS of a modified embodiment of the magnetic head of the third embodiment of the present invention;

FIG. 14 is a perspective view of the head arm assembly of the present invention;

FIG. 15 is a side view of the head stack assembly of the present invention; and

FIG. 16 is a plane view of the magnetic recording device of the present invention.

DETAILED DESCRIPTION OF THE INVENTION

Embodiments of the magnetic head including a magneto-resistance effect element and side shields of the present invention will be described hereafter with reference to the attached drawings.

First Embodiment

FIGS. 2A and 2B show the basic structure of the magnetic head including a magneto-resistance effect element and side shields of a first embodiment of the present invention. In a magnetic head 1 of the present invention, a magneto-resistance effect element V configured of a multilayer film of a spin valve structure is interposed between a pair of shields (a lower shield S1 and an upper shield S2) in the down track direction to configure a single reader. As schematically shown in FIG. 3, the magneto-resistance effect element V primarily has a free layer 3 of which the magnetization direction changes with respect to the external magnetic field, a pinned layer 4 of which the magnetization direction is fixed with respect to the external magnetic field, a spacer layer 5 situated between the free layer 3 and the pinned layer 4, and a pinning layer 6 adjacent to the pinned layer 4 and fixing the magnetic field of the pinned layer 4. The magneto-resistance effect element V is, for example, a CPP-TMR element in which the current flows in the direction perpendicular to the main surfaces of the layers, and the spacer layer 5 is a tunnel barrier layer. The magneto-resistance effect element V may include a seed layer situated in the lower part, a cap layer situated in the upper part, and the like, which are not shown, in addition to the free layer 3, the pinned layer 4, the spacer layer 5, and the pinning layer 6.

As shown in FIG. 2A, side shields 2 are provided on both sides of the magneto-resistance effect element V in the cross track direction, respectively. The side shields 2 are soft magnetic material layers and also function as bias magnetic field application layers. Although not shown, insulating layers may be provided between the lateral surfaces of the magneto-resistance effect element V and the side shields 2. The pair of side shields 2 is magnetically coupled to the upper shield S2, respectively. Then, adjacent to the upper shield S2, an anisotropy-application layer 8 extending in the cross track direction along the upper shield S2 is provided. The anisotropy-application layer 8 is an antiferromagnetic layer (for example, an IrMn layer) and magnetized in the cross track direction. Further, the down track direction is the direction along the tracks of a recording medium (HD), and the cross track direction is the direction perpendicular to the down track direction and crossing the tracks. The portion between the lower shied S1 and upper shield S2 that excludes and surrounds the magneto-resistance effect element V and side shields 2 is filled with an insulating layer 7 consisting of aluminum oxide (for example, $Al_2O_3$) or silicon oxide (for example, $SiO_2$).

The lower shield S1 and upper shield S2 are provided so as to cover the magneto-resistance effect element V of the magnetic head 1 in a plan view seen from above in the lamination direction of the layers of the magneto-resistance effect element V. The magneto-resistance effect element V and the side shields 2 are provided primarily on and around the air bearing surface ABS of the magnetic head 1 that faces a recording medium in a plan view seen from above in the lamination direction. The lower shield S1, the upper shield S2, the magneto-resistance effect element V, and the side shields 2 are exposed on the ABS. Further, although not shown, a protective film covering the ABS may be provided and, in such a case, the lower shield S1, the upper shield S2, the magneto-resistance effect element V, and the side shields 2 may also be covered with the protective film. However, even in such a case, if the ABS is covered with a protective film, the lower shield S1, the upper shield S2, the magneto-resistance effect element V, and the side shields 2 are exposed on the ABS, not retracted from the ABS in the height direction (the direction perpendicular to the ABS).

On the other hand, the anisotropy-application layer 8 is not exposed on the ABS and is provided at a position retracted from the ABS in the height direction. It is preferable that the anisotropy-application layer 8 is retracted by 100 nm or less in the height direction from the rear end of the free layer 3 (the end opposite to the ABS) when, for example, the free layer 3 has a dimension of 30 to 40 nm in the height direction. Moreover, it is preferable that the anisotropy-application layer 8 is retracted by 30 to 100 nm from the ABS in the height direction. It is preferable that the anisotropy-application layer 8 is spaced from the ABS at least so as not to overlap with the magneto-resistance effect element V in a plan view seen from above in the lamination direction. The anisotropy-application layer 8 overlaps with the upper shield S2 at a position away from the ABS, imparts exchange anisotropy to the upper shield S2, and magnetizes the upper shield S2 in a desired direction (one way in the cross track direction). Then, the pair of side shields 2 each magnetically coupled to the upper shield S2 is magnetized in the same direction. Consequently, the free layer of the magneto-resistance effect element V surrounded by the upper shield S2 and the pair of side shields is magnetized in the same direction as the upper shield S2 and the pair of side shields 2 when no external magnetic field is applied.

A recess part 7a corresponding to the anisotropy-application layer 8 in shape and dimension is formed in the insulating layer 7 between the lower shield S1 and the upper shield S2 at a position facing the anisotropy-application layer 8. A recess part S2a corresponding to the recess part 7a of the insulating layer 7 occurs in the top surface of the upper shield S2 formed to a substantially uniform thickness on the insulating layer 7. Then, the anisotropy-application layer 8 is formed so as to fill the recess part S2a in the top surface of the upper shield S2. Thus, the increase in thickness due to the anisotropy-application layer 8 at a position retracted from the ABS in the height direction is offset by the recess part 7a formed in the insulating layer 7. The overall thickness of the reader R is kept at an equal level to the configuration in which the anisotropy-application layer 8 is absent. Therefore, the anisotropy-application layer 8 does not increase the thickness particularly on the ABS in spite of the configuration having the side shields 2 and anisotropy-application layer 8, whereby the read gap can be kept small. Moreover, even if the anisotropy-application layer 8 is made of IrMn, which is a relatively corrosive material, the anisotropy-application layer 8 is restrained from eroding since it is not exposed on the ABS. The thickness of the upper shield S2 is kept nearly uniform even though the recess part S2a is formed, whereby the electric resistance of the reader R does not fluctuate. The insulating layer 7 is thinner in part. However, the insulating layer 7 is a member that has only to ensure electric insulation, and therefore the change in the thickness of the insulating layer 7 is unlikely to affect the function of the reader R.

The core part of the method of producing the magnetic head 1 will be briefly described. First, as shown in FIG. 4, the lower shield S1 of the reader R is formed by plating and flattened by chemical-mechanical polishing (CMP) (Step 101), and the magneto-resistance effect element V is formed on a part of the lower shield S1 (Step S102). The magneto-resistance effect element V includes at least the free layer 3, the pinned layer 4, the spacer layer 5, and the pinning layer 6 as shown in FIG. 3, and is formed so as to be exposed on the ABS. As shown in FIG. 5, the side shields 2 including a soft magnetic substance are formed on both sides of the magneto-resistance effect element V in the cross track direction (Step 103). As shown in FIG. 6, the insulating layer 7 is formed on the portion of the lower shield S1 where the magneto-resistance effect element V and side shields 2 are absent so as to surround these elements (Step 104). Then, as shown in FIG. 7, the substantially flat top surface of the insulating layer 7 is processed by milling or the like to form the recess part 7a (Step 105). The recess part 7a is provided at a position retracted from the ABS in the height direction. Subsequently, as shown in FIG. 8, the upper shield S2 is formed on the magneto-resistance effect element V and the surrounding insulating layer 7 (Step 106). Since the bottom surface of the upper shield S2 is set in the recess part 7a of the insulating layer 7, the upper shield S2 formed to a substantially uniform thickness has a step where the recess part 7a is present and the recess part S2a occurs in the top surface of the upper shield S2. The upper shield S2 is magnetically coupled to each of the side shields 2. Then, as shown in FIGS. 2A and 2B, an IrMn layer that is an antiferromagnetic layer is formed to fill the recess part S2a in the top surface of the upper shield S2. The IrMn layer is the anisotropy-application layer 8 adjacent to the upper shield S2, extending along the upper shield in the cross track direction, imparting exchange anisotropy to the upper shield S2, and magnetizing the upper shield S2 in a desired direction (one way in the cross track direction) (Step 107). Consequently, the pair of side shields 2 each magnetically coupled to the upper shield S2 is magnetized in the same direction as the upper shield S2 (the above-mentioned desired direction). Subsequently, although not shown, an insulating layer and the like may be formed on the upper shield S2 and the anisotropy-application layer 8.

As described above, in the present invention, the upper shield S2 and the pair of side shields 2 are magnetized in a desired direction (one way in the cross track direction) using the anisotropy-application layer 8, whereby the magnetization direction of the free layer 3 of the magneto-resistance effect element V surrounded by the upper shield S2 and the pair of side shields 2 is aligned in the cross track direction when no external magnetic field is applied. As a result, the accuracy of a reading magnetic record on an external recording medium is improved. Particularly, the portion of the upper shield that is not in contact with the anisotropy-application layer 8 is limited to the ABS and a small vicinity thereof. The upper shield S2 is mostly in contact with the anisotropy-application layer 8, and exchange anisotropy is sufficiently imparted. Therefore, the magnetization of the free layer 3 of the magneto-resistance effect element S is sufficiently controlled by the upper shield S2 and the side shields 2 in this embodiment as well. Additionally, the anisotropy-application layer 8 is absent in the ABS and positioned away from the ABS in this embodiment. Therefore, the read gap is not increased on the ABS by the anisotropy-application layer 8 and the entire recording head is not enlarged, while the magnetization direction is controlled to improve the accuracy of reading as described above, whereby a high performance and a compact recording head can be obtained.

FIG. 9 shows a modified version of the first embodiment. In this modified embodiment, the anisotropy-application layer 8 is disposed below the upper shields S2, not above the upper shields S2. In other words, after the recess part 7a is formed in the insulating layer 7 as described above, an IrMn film is formed to fill the recess part 7a and form the anisotropy-application layer 8. The top surface of the anisotropy-application layer 8 in the lamination direction is formed flush with (at the same level as) the top surface in the lamination direction of the insulating layer 7 excluding the recess part 7a, and the upper shield S2 is formed on this surface. The upper shield S2 is formed as a flat layer. Also in this configuration, the upper shield S2 and the pair of side shields 2 are magnetized in a desired direction by the anisotropy-application layer 8, the magnetization direction of the free layer 3 of the magneto-resistance effect element V is controlled, and additionally, an increase in the read gap is prevented.

Second Embodiment

The first embodiment relates to the magnetic head 1 having a single reader. The magnetic head 1 of this embodiment is a multi-reader head 1 in which multiple readers are disposed one on top of another in the down track direction as shown in FIG. 10. More specifically, multiple (for example, two) readers R1 and R2 having substantially the same configuration as the reader shown in FIGS. 2A and 2B are stacked, and an inter-element insulating layer 9 is provided between the vertically adjacent readers R1 and R2. Moreover, the shields adjacent to the next reader in the vertical direction, namely the upper shield S2 of the lower reader R1 and the lower shield S3 of the upper reader R2 are each formed thin. In each of the multiple readers R1 and R2, the recess part 7a is formed in the insulating layer 7 as in the first embodiment, recess parts S2a and S4a occur in the top surface of the upper shields S2 and S4 formed thereon, and the anisotropy-application layers 8 are formed to fill the recess parts S2a and S4a. In each reader, the adjacent upper shield S2 or S4 and the side shields 2 magnetically coupled thereto are each magnetized in a desired direction by the anisotropy-application layers 8.

The method of producing the magnetic head of this embodiment includes, as in the first embodiment, forming the lower shield S1 of the lower reader R1 and forming the magneto-resistance effect element V, the anisotropy-application layer 8, the side shields 2, and the insulating layer 7 thereon. Then, the recess part 7a is formed in the top surfaces of the insulating layer 7 at a position retracted from the ABS in the height direction. Then, the upper shield S2 is formed on the magneto-resistance effect element V and insulating layer 7 so that the recess part 2a occurs in the top surface of the upper shield S2. The anisotropy-application layer 8 imparting exchange anisotropy to the upper shield S2 is formed to fill the recess part S2a in the top surface of the upper shield S2.

Subsequently, an interelement insulating layer 9 is formed above the upper shield S2 and anisotropy-application layer 8. The upper reader R2 is formed on the inter element insulating layer 9 by substantially the same process as described above. In other words, the lower shield S3, the magneto-resistance effect element V, the side shields 2, and the insulating layer 7 are formed, and the recess part 7a is formed in the top surface of the insulating layer 7 at a position retracted from the ABS in the height direction. The upper shield S4 is formed on the magneto-resistance effect element V and the insulating layer 7 so that the recess part S4a occurs in the top surface of the upper shield S4. The anisotropy-application layer 8 is formed to fill the recess part S4a in the top surface of the upper shield S4.

In this embodiment, as in the first embodiment, each of the readers R1 and R2 has the side shields 2 and the anisotropy-application layer 8, whereby the magnetization direction of the free layer 3 can be aligned when no external magnetic field is applied, the read gap is kept small, and the RRS that is the distance between the vertically adjacent readers R1 and R2 is kept small; thus, high reading performance can be maintained.

FIG. 11 shows a modified version of this embodiment. In this modified embodiment, as in the modified embodiment of the first embodiment shown in FIG. 9, the anisotropy-application layer 8 is disposed below the upper shields S2 and S4, not above the upper shields S2 and S4 in each of the readers R1 and R2. In other words, the anisotropy-application layer 8 is formed to fill the recess part 7a formed in the insulating layer 7. The upper shields S2 and S4 are flat layers. Also in this configuration, the magnetization direction of the free layer 3 of the magneto-resistance effect element V can be controlled, and additionally, an increase in the read gap can be prevented in each of the readers R1 and R2.

Third Embodiment

In the above-described the second embodiment, the multi-reader head 1 in which two readers R1 and R2 are stacked one on top of another in the down track direction is described. In this embodiment, as shown in FIG. 12, three readers R1, R2, and R3 are stacked on top of another in the down track direction. More specifically, the three readers R1, R2, and R3 having substantially the same configuration as the reader shown in FIGS. 2A and 2B are stacked with the interelement insulating layers 9 in between. The shields adjacent to the next reader, namely the upper shield S2 of the lowermost reader R1, the lower shield S3 and upper shield S4 of the immediately above (middle) reader R2, and the lower shield S5 of the uppermost reader R3 are formed thin. In each of the multiple readers R1, R2, and R3, the recess parts 7a are formed in the insulating layers 7 as in the first and second embodiments, recess parts S2a, S4a, and S6a occur in the upper surface of the upper shields S2, S4, and S6 formed thereon, and the anisotropy-application layers 8 are formed to fill the recess parts S2a, S4a, and S6a. In each of the readers R1, R2, and R3, the anisotropy-application layers 8 impart exchange anisotropy to the upper shields S2, S4, and S6. This magnetic head 1 is produced by repeating the processes of the method of producing the magnetic head of the first embodiment three times, in other words, by repeating the processes of forming the upper reader one additional time after the processes of the method of producing the magnetic head of the second embodiment. Also in this embodiment, substantially the same effect as obtained in the first and second embodiments is obtained.

Moreover, as a modified version of this embodiment, as shown in FIG. 13, the anisotropy-application layers 8 can be disposed below the upper shield S2, S4, and S6, not above the upper shields S2, S4, and S6 in each of the readers R1, R2, and R3. In this modified embodiment, as in the modified embodiments of the first and second embodiments, the anisotropy-application layers 8 are formed to fill the recess parts 7a formed in the insulating layers 7 and magnetically coupled to the side shields 2 in each of the readers R1, R2, and R3. The upper side shields S2, S4, and S6 are flat layers.

Also in the embodiments shown in FIGS. 12 and 13, the magnetization direction of the free layer 3 of the magneto-resistance effect element V can be controlled, and additionally, an increase in the read gap is prevented in each of the readers R1, R2, and R3.

As an application of this embodiment, although not shown, the present invention can be used in a multi-reader head having four or more readers. In other words, the anisotropy-application layer 8 is formed to fill a recess part occurring in the upper shield of each reader or a recess part formed in the insulating layer of each reader at a position retracted from the ABS in the height direction, whereby the RRS between adjacent readers can individually be reduced.

Generally, the record reading performance (the reading accuracy and the like) of the magnetic head 1 is affected by the read gap and the RRS on the ABS facing the recording medium. In the present invention, the anisotropy-application layer 8 is absent on the ABS and therefore does not increase the read gap or RRS on the ABS. Thus, high reading performance can be maintained. On the other hand, the upper shield is magnetized in a desired direction (one way in the cross track direction) by the anisotropy-application layer 8 situated at a position retracted from the ABS in the height direction, and the side shields 2 on both sides of the magneto-resistance effect element V that are magnetically coupled to the upper shield are magnetized in the same direction. As a result, the magnetization direction of the free layer 3 of the magneto-resistance effect element V can efficiently be aligned when no external magnetic field is applied. The present invention made these effects compatible for the first time.

In the above-described embodiments, the anisotropy-application layer 8 is disposed above or below the upper shield of a reader along the upper shield. However, the anisotropy-application layer 8 may be disposed above or below the lower shield of a reader along the lower shield.

A head gimbal assembly and HDD using the magnetic head of the present invention will be described hereafter. A head gimbal assembly 421 shown in FIG. 14 includes a magnetic head slider 10 including the magnetic head 1 and a suspension 420 elastically supporting the magnetic head slider 10. The suspension 420 has a blade spring load beam 422 made of stainless steel, a flexure 423 provided at one end of the load beam 422, and a base plate 424 provided at the other end of the load beam 422. The magnetic head slider 10 is joined to the flexure 423 and given a proper degree of freedom by the flexure 423. A gimbal part (not shown) for keeping the orientation of the magnetic head slider 10 constant is provided at the portion of the flexure 423 where the magnetic head slider 1 is attached.

The head gimbal assembly 421 is attached to an arm 430. The arm 430 moves the magnetic head slider 10 in the cross track direction CT. The base plate 424 is attached to one end of the arm 430. A coil 431 configuring a part of a voice coil motor is attached to the other end of the arm 430. A bearing 433 is provided in a middle part of the arm 430. The arm 430 is rotatably supported by a shaft 434 attached to the bearing 433. The arm 430 and the voice coil motor driving the arm 430 configure an actuator.

FIG. 15 is a side view of a head stack assembly 450. The head stack assembly 450 has a carriage 451 having multiple arms 430, and the head gimbal assemblies 421 attached to the arms 430. The head gimbal assemblies 421 are attached to the arms 430 so as to be arranged in the height direction HT with a space in between. A pair of permanent magnets 432 is disposed at positions facing each other via the coil 431 in between.

FIG. 16 is a plan view of a magnetic recording device (HDD). The head stack assembly 450 is installed in a magnetic recording device 460. The magnetic recording device 460 has multiple magnetic recording media M attached to a spindle motor 461. For each magnetic recording medium M, two magnetic head sliders 10 are disposed facing each other across the magnetic recording medium M. The head stack assembly 450 excluding the magnetic head sliders 10 and the actuator configure a positioning device, supporting the magnetic head sliders 10 and positioning the magnetic head sliders 10 with respect to the magnetic recording medium M. The magnetic head sliders 10 are moved in the cross track direction CT of the magnetic recording medium M and positioned with respect to the magnetic recording medium M by the actuator. The magnetic head sliders 10 record information on the magnetic recording medium M by a magnetic recording element and reproduce information recorded on the magnetic recording medium M by the reader (the magneto-resistance effect element) of the magnetic head 1.

Desirable embodiments of the present invention are presented and described in detail. However, it should be understood that various changes and modifications are available to the extent of not departing from the gist or scope of the attached scope of claims.

What is claimed is:

1. A magnetic head, comprising:
   a magneto-resistance effect element in the form of a multilayer film;
   a pair of shields between which the magneto-resistance effect element is interposed in the lamination direction of layers of the magneto-resistance effect element, each of which functions as an electrode;
   a pair of side shields, with one of said side shields on each side of the magneto-resistance effect element in the direction perpendicular to the lamination direction of the magneto-resistance effect element interposed between the pair of shields, the side shields magnetically coupled to either of the pair of shields; and
   an anisotropy-application layer disposed adjacent to the shield magnetically coupled to the pair of side shields, wherein:
   the pair of shields, the magneto-resistance effect element, and the pair of side shields are exposed on an air bearing surface facing a recording medium, and the anisotropy-application layer is not exposed on the air bearing surface and is provided at a position away from the air bearing surface,
   a recess part provided in the insulating layer surrounding the magneto-resistance effect element and the side shields at a position away from the air bearing surface,
   a recess part provided in the shield situated above the insulating layer in the lamination direction at a position overlapping with the recess part in the insulating layer in a plan view, and
   the anisotropy-application layer is located in the recess part in the shield.

2. The magnetic head according to claim 1, wherein the anisotropy-application layer is made of an antiferromagnetic material.

3. The magnetic head according to claim 1, wherein the top surface in the lamination direction of the portion excluding the recess part of the shield includes the recess part and the top surface in the lamination direction of the anisotropy-application layer are situated at the same level.

4. The magnetic head according to claim 1, wherein multiple readers including the pair of shields, the magneto-resistance effect element, the pair of side shields, and the anisotropy-application layer are stacked and separated by an interelement insulating layer.

5. A head gimbal assembly, comprising
   a magnetic head slider including the magnetic head according to claim 1 and
   a suspension elastically supporting the magnetic head slider, wherein
   the suspension has a flexure to which the magnetic head slider is joined, a load beam of which one end is connected to the flexure, and a base plate connected to the other end of the load beam.

6. A magnetic recording device, comprising
a magnetic head slider including the magnetic head according to claim 1,
a magnetic recording medium facing the magnetic head slider,
a spindle motor rotating/driving the magnetic recording medium, and
a device supporting the magnetic head slider and positioning the same with respect to the magnetic recording medium.

* * * * *